United States Patent [19]

Witt

[11] Patent Number: 5,073,531

[45] Date of Patent: Dec. 17, 1991

[54] OLEFIN POLYMERIZATION CATALYSTS AND PREPARATION METHOD

[75] Inventor: Donald R. Witt, Bartlesville, Okla.

[73] Assignee: Phillips Petroleum Company, Bartlesville, Okla.

[21] Appl. No.: 520,372

[22] Filed: May 7, 1990

[51] Int. Cl.$^5$ .................................................. C08F 4/64
[52] U.S. Cl. ...................................... 502/228; 502/234; 502/236; 502/237; 502/239; 502/242; 502/256
[58] Field of Search .............. 502/228, 234, 236, 237, 502/239, 242, 256

[56] References Cited

U.S. PATENT DOCUMENTS

| | | | |
|---|---|---|---|
| 3,979,215 | 9/1976 | Emblem et al. | 106/55 |
| 3,998,996 | 12/1976 | Toth | 526/114 |
| 4,006,175 | 2/1977 | Termin et al. | 260/438.5 |
| 4,018,816 | 4/1977 | Onoda et al. | 502/236 |
| 4,206,297 | 6/1980 | Hoff et al. | 526/106 |
| 4,301,034 | 11/1981 | McDaniel | 252/452 |
| 4,339,559 | 7/1982 | McDaniel | 526/106 |

*Primary Examiner*—Patrick P. Garvin
*Assistant Examiner*—Brent M. Peebles
*Attorney, Agent, or Firm*—Laney, Dougherty, Hessin & Beavers

[57] ABSTRACT

Sodium-free olefin polymerization catalysts having high polymerization activities and methods of preparing such catalysts are provided. A hydrolyzable silicate ester and a hydrolyzable acid-generating chromium compound are combined with water and an organic solvent whereby a hydrolysis reaction solution is formed comprising silica and chromium. Sufficient acid-neutralizing gelling agent is added to the solution to form a gelled silica-chromium catalyst and the catalyst is aged to stabilize its structure. Water and solvent are removed from the catalyst and the catalyst is activated.

23 Claims, No Drawings

OLEFIN POLYMERIZATION CATALYSTS AND PREPARATION METHOD

BACKGROUND OF THE INVENTION

1. Field of the Invention

The present invention relates generally to olefin polymerization catalysts and preparation methods, and more particularly, to olefin polymerization catalysts having high polymerization activities and a method of preparing such catalysts.

2. Description of the Prior Art

The production of sodium-free silica by hydrolyzing a silicate ester in an organic solvent under conditions such that only one phase is present is known. Further, it is known to introduce a transition metal compound into the silica containing solution and to cogel the silica and transition metal compound to form a catalyst. For example, U.S. Pat. No. 4,301,034 issued Nov. 17, 1981 discloses a process for producing sodium-free silica by the hydrolysis of a silicate ester and forming a transition metal catalyst therewith. The process basically comprises hydrolyzing a silicate ester in the presence of an organic solvent in which the ester and resulting silica are soluble. In order to catalyze the hydrolysis reaction, a strong mineral acid such as sulfuric acid is added to the reactant solution. A transition metal compound is subsequently added to the solution followed by the addition of a gelling agent whereby a catalyst comprised of gelled silica and transition metal oxide is formed.

By the present invention, an improved hydrolysis method is provided for preparing polymerization catalysts whereby the addition of an acid to the hydrolysis solution for catalyzing the hydrolysis reaction is obviated and the catalysts produced have high polymerization activities.

SUMMARY OF THE INVENTION

An improved method of preparing sodium-free olefin polymerization catalysts is provided. In accordance with the method, a hydrolyzable silicate ester and a hydrolyzable acid-generating transition metal compound are combined with water and an organic solvent whereby a hydrolysis reaction solution is formed comprising silica and transition metal. A sufficient amount of an acid-neutralizing gelling agent is combined with the solution to form a gelled silica-transition metal catalyst, and the catalyst is aged to develop and stabilize its structure. Water and solvent are separated from the catalyst and the catalyst is activated. Since the catalyst is not derived from sodium silicate, it is not contaminated with sodium and there is no need to remove any such contaminates by water washing or the like. In addition, because a hydrolyzable acid-generating transition metal compound is utilized which produces acid in situ for catalyzing the hydrolysis of the silicate ester, a separate mineral acid or other hydrolysis catalyst is not needed.

In a preferred method, the silicate ester is tetra-n-ethyl orthosilicate and the acid generating transition metal compound is chromic chloride. Other metal compounds can be added to the hydrolysis reaction solution prior to gelling to form modified catalysts.

Improved olefin polymerization catalysts prepared by the above described method are also provided by this invention. The catalysts have high surface areas, high pore volumes and high polymerization activities.

It is, therefore, a general object of the present invention to provide improved polymerization catalysts and a method of preparing such catalysts.

A further object of the present invention is the provision of an improved hydrolysis method of preparing silica-transition metal polymerization catalysts whereby the use of a separate strong acid for catalyzing the hydrolysis reaction is obviated.

Other and further objects, features and advantages of the present invention will be readily apparent to those skilled in the art upon a reading of the description of preferred embodiments which follows.

DESCRIPTION OF PREFERRED EMBODIMENTS

This invention provides an improved method of preparing silica-transition metal catalysts having high surface areas, high pore volumes and high polymerization activities.

A hydrolyzable silicate ester and a hydrolyzable acid-generating transition metal compound are dissolved along with a suitable quantity of water in a solvent under conditions such that only one phase is present. The hydrolysis of the acid-generating transition metal compound provides acid for catalyzing the hydrolysis of the silicate ester whereby a solution comprising silica and transition metal is obtained. Prior to gelling the silica and transition metal with an acid-neutralizing gelling agent, another soluble metal compound can be added, if desired, to produce a modified catalyst. The gelled silica-transition metal catalyst formed is aged to stabilize its structure after which water and solvent are removed and the catalyst is activated.

The silicate esters which can be utilized for forming the catalysts of this invention are those represented by the formula:

$$Si(OR)_4$$

where R is an alkyl group containing from 1 to 6 carbon atoms preferably 2 or 3 carbon atoms. A presently preferred silicate ester is tetra-n-ethyl orthosilicate. Other suitable esters are tetra-n-propyl orthosilicate, tetra-isobutyl orthosilicate, tetra-n-pentyl orthosilicate, and the like.

The organic solvent can be any organic liquid which mutually dissolves the silicate ester, the acid-generating transition metal compound used and water, whereby phase separation does not occur during hydrolysis. Preferably, the solvent is an aliphatic alcohol having from 1 to 6 carbon atoms. Exemplary solvents include methanol, ethanol, 1-propanol, isopropanol, 1-butanol and the like, with methanol being the most preferred.

The amount of water utilized for carrying out the hydrolysis reactions is preferably in the range of from about 0.5 to about 10 moles of water per mole of silicate ester utilized, most preferably 1 to 3 moles of water per mole of silicate ester. The transition metal compound which hydrolyzes to form an acid which in turn catalyzes the silicate ester hydrolysis is combined with the silicate ester and water in an amount sufficient to provide a silica-transition metal catalyst containing from about 0.1% to about 2% by weight transition metal. Generally the transition metal compound is added in an amount in the range of from about 0.001 to about 0.03 moles of transition metal compound per mole of silicate ester utilized.

The transition metal compounds which are suitable for use in accordance with the present invention are those transition metal salts which readily hydrolyze in water to form an acid of sufficient strength to catalyze the silicate ester hydrolysis reaction. Examples of such salts are transition metal chlorides, fluorides, bromides and iodides. Examples of transition metals which can be utilized are chromium, titanium, zirconium and the like. The most preferred transition metal is chromium and the most preferred acid generating salt is chromic chloride.

In carrying out the method, the silicate ester and hydrolyzable acid-generating transition metal compound used are combined with the organic solvent and deionized water and mixed. The resulting solution is heated to a temperature in the range of from about 20° C. to the reflux temperature of the initial reaction mixture for a period of time ranging from about 5 minutes to about 2 hours to obtain hydrolysis of the silicate ester.

If it is desired to form a catalyst including a second metal compound such a chromium, titanium, aluminum or zirconium compound, such a compound can be introduced into the hydrolysis reaction solution prior to gelling the solution. Preferred are such metal compounds as alkoxides which form complexes with silica. The most preferred metal alkoxides are those of the general formula:

$$M(OR')_4$$

wherein R' is an alkyl group having from 1 to 6 carbon atoms.

After the hydrolysis reactions have taken place and an additional metal compound, if any, has been added to the hydrolysis reaction solution, the silica and transition metal compound are caused to gel by adding a gelling agent which neutralizes acid in the solution. Suitable acid-neutralizing gelling agents include inorganic bases, ammonia and primary, secondary or tertiary alkyl or cycloalkyl amines which are soluble in water or the organic solvent employed. The preferred gelling agent is ammonium hydroxide, with an aqueous ammonium hydroxide solution containing about 25% by volume ammonium hydroxide being convenient.

During the hydrolysis reaction, the reaction solution can be mixed by mechanical stirring or, if the reaction is carried out at reflux temperature, the reaction solution can be mixed by boiling. Reaction temperatures employed can vary from about room temperature to the boiling point of the reaction solution. During and after the gelation of the reaction solution, stirring or agitation of the solution should be avoided.

After gellation of the reaction solution, the gel formed is aged, preferably in the presence of deionized water containing the acid-neutralizing agent utilized for 1-10 hours, preferably for a time period in the range of from 2 hours to 6 hours. The aging of the gel can be carried out at any temperature from room temperature to 100° C., but preferably the aging is carried out at a temperature of about 90° C. The aging step allows the large pore silica-metal gel structure to develop and stabilize. Water and solvent are next removed from the silica-transition metal catalyst formed using conventional techniques. Preferably, excess liquid is drained from the catalyst followed by washing or soaking the catalyst in an organic liquid in which water is miscible, i.e., one or more aliphatic alcohols such as methanol and propanol. The resulting substantially water-free catalyst is then dried, such as by vacuum oven tray drying to remove the organic solvent without harming the large pore gel structure. The drying temperature can range from room temperature to about 150° C.

After removal of water and solvent from the catalyst and prior to use, the catalyst is activated. Preferably, the activation of the catalyst is accomplished by calcining the catalyst in dry air at a temperature in the range of from about 500° C. to about 920° C., most preferably 600° C. to 870° C., for a time period in the range of from about 1 hour to about 10 hours, most preferably about 5 hours.

The catalyst of this invention can be used to polymerize 1-olefin monomers containing from 2 to 8 carbon atoms. The catalyst is particularly suitable for use in producing ethylene homopolymers and copolymers from mixtures of ethylene and one or more comonomers. Exemplary comonomers include aliphatic 1-olefins, such as propylene, 1-butene, 1-hexene, and the like, and conjugated or non-conjugated diolefins, such as 1,3-butadiene. The polymers can be prepared using the activated catalysts of this invention by gas phase polymerization, solution polymerization and slurry polymerization techniques known in the art. The catalysts of this invention are particularly suitable for carrying out slurry (particle form) polymerizations for producing high melt index polymers. Such slurry polymerizations are carried out in an inert diluent such as a paraffin, aromatic or cycloparaffin liquid hydrocarbon at a temperature whereby the resulting polymer is insoluble. For predominantly ethylene polymers, the slurry process is carried out at a temperature in the range of from about 80° C. to about 110° C. at a pressure in the range of from about 350 psig to about 550 psig.

In order to further illustrate the catalysts and methods of the present invention, the following examples are given. The components and procedures utilized in the examples are intended to be illustrative of the invention and not limiting thereto.

EXAMPLE 1

Various quantities of methanol, water, chromic chloride ($CrCl_3$ $6H_2O$) and tetra-n-ethyl orthosilicate were combined and heated to temperatures in the range of from about 50° C. to about 90° C. for time periods in the range of from about 10 minutes to about 40 minutes. The resulting hydrolysis reaction solutions were gelled after cooling to a temperature of about 24° C. by the addition of an aqueous ammonium hydroxide solution (25% by volume $NH_4OH$) to the reaction solution. The quantity of aqueous ammonium hydroxide solution added was that which was required to produce gellation, i.e., a quantity in the range of from about 12 to about 20 milliliters to give a pH above 7. The resulting gels were drained and aged in 900-1000 milliliter portions of deionized water containing about 0.5 milliliters of ammonium hydroxide at temperatures in the range of from about 50° C. to about 100° C. for time periods of from about 1 hour to about 6 hours. After aging, each gel was again drained and then twice soaked in 750 ml portions of methanol and once in a 750 ml portion of propanol. The resulting substantially water-free gelled catalysts were dried at 250° F. in an oven. Subsequent to drying the gelled catalysts were activated by calcination in the presence of dry air for a time period of 5 hours at a temperature of 816° C.

The various catalysts of this invention, prepared as described above, were tested in ethylene polymerization runs carried out in a 2 liter Marlex type bench reactor under slurry (particle form) conditions. The diluent used was isobutane, and the reactor temperature was held at 109° C. during each run. The reactor pressure was held at 550 psig with ethylene being fed on demand. The quantity of catalyst utilized in each run ranged from 0.05 g to 0.07 g with 1.25 pounds of isobutane. Generally, run times of about 30 to 50 minutes were used.

The polymer recovered from each polymerization run was tested for Melt Index in grams per 10 minutes in accordance with ASTM D1238, condition E. In addition, the polymerization activity of each catalyst was calculated in grams of polymer per gram of catalyst.

The results of these tests are set forth in Table 1 below.

TABLE I

| Run | Methanol, ml | Water, ml | Chromium Chloride, g | Tetraethyl Orthosilicate, ml | Melt Index, g/10 min | Polymerization Activity, g/g/hr |
| --- | --- | --- | --- | --- | --- | --- |
| 1 | 200 | 200 | 1.3 | 100 | 1.8 | 6660 |
| 2 | 200 | 24 | 1.3 | 100 | 2.68 | 6790 |
| 3 | 200 | 40 | 1.3 | 100 | 1.85 | 5400 |
| 4 | 200 | 16 | 1.3 | 100 | 1.66 | 5870 |
| 5 | 200 | 10 | 1.3 | 100 | 1.36 | 7510 |
| 6 | 100 | 50.15 | 2.6 | 200 | 2.4 | 7290 |
| 7 | 200 | 30 | 1.3 | 100 | 2.04 | 6050 |
| 8 | 200 | 100 | 5.2 | 400 | 1.24 | 7200 |

EXAMPLE 2

The catalyst preparations described in Example 1 above were repeated except that various quantities of a titanium alkoxide [Ti(O—C$_3$H$_6$)$_4$] were added to the hydrolysis reaction solution prior to gellation.

The catalysts produced were used in polymerization runs and tested as described in Example 1 above.

The results of these tests are set forth in Table II below.

TABLE II

| Run | Methanol, ml | Water, ml | Chromium Chloride, g | Tetraethyl Orthosilicate, ml | Titanium Alkoxide, ml | Melt Index, g/10 min | Polymerization Activity, g/g/hr |
| --- | --- | --- | --- | --- | --- | --- | --- |
| 1 | 200 | 200 | 1.3 | 100 | 2.2 | 0.76 | 8480 |
| 2 | 200 | 10 | 1.3 | 100 | 5 | 2.27 | — |
| 3 | 200 | 16 | 1.3 | 100 | 2.5 | 1.5 | — |

From the test results set forth in Tables I and II above, it can be seen that the catalysts of the present invention have high melt index potential and high polymerization activities.

I claim:

1. An improved method of preparing a gelled sodium free, large pore polymerization catalyst comprising:
   combining a hydrolyzable silicate ester and a hydrolyzable acid-generating transition metal compound with water and an organic solvent whereby a hydrolysis reaction solution is formed comprising silica and transition metal, said transition metal being present in said solution in an amount sufficient when said solution is gelled to produce a silica-transition metal catalyst containing from about 0.1% to about 2% by weight transition metal;
   adding sufficient acid-neutralizing agent to said solution without stirring or agitating said solution to form a gelled silica-transition metal catalyst;
   aging said catalyst to develop and stabilize a large pore silica-transition metal gel structure;
   separating water and organic solvent from said catalyst; and
   activating said large pore gel structure catalyst by subjecting it to a calcination process.

2. The method of claim 1 wherein said organic solvent is an aliphatic alcohol having from 1 to 6 carbon atoms.

3. The method of claim 1 wherein said transition metal is chromium.

4. The method of claim 1 wherein said silicate ester is tetra-n-ethyl orthosilicate.

5. The method of claim 1 wherein said hydrolyzable acid-generating transition metal compound is chromic chloride.

6. The method of claim 1 wherein said acid-neutralizing agent is an aqueous solution of ammonium hydroxide.

7. The method of claim 1 wherein said aging step is carried out in the presence of an aqueous solution of said acid-neutralizing agent.

8. The method of claim 1 wherein the step of separating water and organic solvent from said catalyst comprises:
   washing said catalyst with a water-miscible organic liquid; and
   drying said catalyst.

9. The method of claim 1 wherein said catalyst is activated by calcining in air at a temperature in the range of from about 500° C. to about 920° C.

10. The method of claim 3 wherein a compound containing a metal selected from the group consisting of titanium, aluminum and zirconium is added to said hydrolysis reaction solution prior to forming said gelled catalyst therein.

11. The method of claim 10 wherein said metal compound is titanium alkoxide.

12. An improved method of preparing a gelled sodium-free, large pre olefin polymerization catalyst of high polymerization activity comprising the steps of:
   combining a hydrolyzable silicate ester and chromic chloride with water and an aliphatic alcohol solvent whereby said chromic chloride hydrolyzes to form an acid which in turn catalyzes the hydrolysis of said silicate ester resulting in a reaction solution comprising silica and chromium, said chromium being present in said reaction solution in an amount sufficient when said solution is gelled to produce a silica-chromium catalyst containing from about 0.1% to about 2% by weight chromium;
   adding an aqueous solution of ammonium hydroxide to said reaction solution without stirring or agitating said solution to neutralize said acid therein and to form a gelled silica-chromium catalyst;

aging said gelled catalyst to develop and stabilize a large pore silica-transition metal gel structure;

washing said catalyst with a water-miscible organic compound to remove water therefrom;

drying said catalyst to remove said organic compound therefrom; and activating said large pore gel structure catalyst by subjecting it to a calcination process.

13. The method of claim 12 wherein said silicate ester is tetra-n-ethyl orthosilicate.

14. The method of claim 13 wherein said aliphatic alcohol is methanol.

15. The method of claim 14 wherein said catalyst is aged in the presence of an aqueous solution of ammonium hydroxide for at least 15 minutes.

16. The method of claim 15 wherein said catalyst is washed with methanol and propanol.

17. The method of claim 16 wherein said catalyst is dried in an oven at a temperature in the range of from about room temperature to about 150° C.

18. The method of claim 17 wherein said catalyst is activated by calcining in air at a temperature in the range of from about 500° C. to about 920° C. for a time period in the range of from about 1 hour to about 10 hours.

19. An olefin polymerization catalyst prepared in accordance with the method of claim 1.

20. An olefin polymerization catalyst prepared in accordance with the method of claim 12.

21. An olefin polymerization catalyst prepared in accordance with the method of claim 13.

22. An olefin polymerization catalyst prepared in accordance with the method of claim 15.

23. An olefin polymerization catalyst prepared in accordance with the method of claim 18.

* * * * *